April 29, 1941. W. R. FREEMAN 2,239,955
INERTIA-OPERATED RATIO CHANGING BRAKE ACTUATING SYSTEM
Filed Sept. 2, 1939
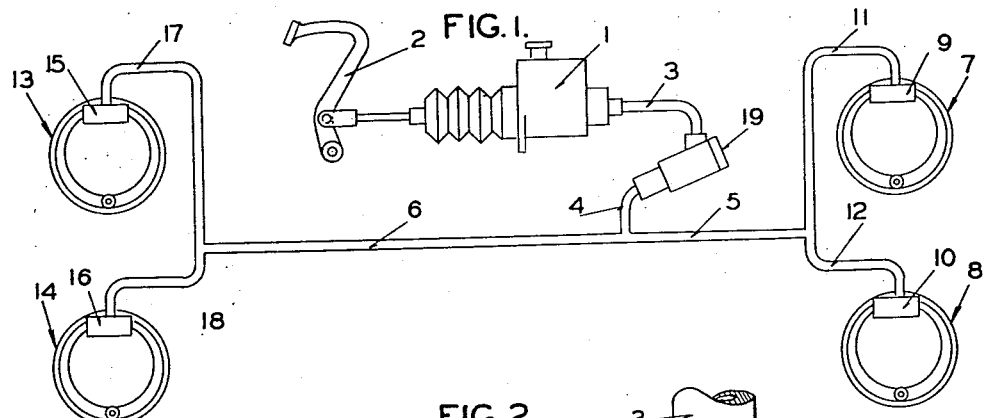
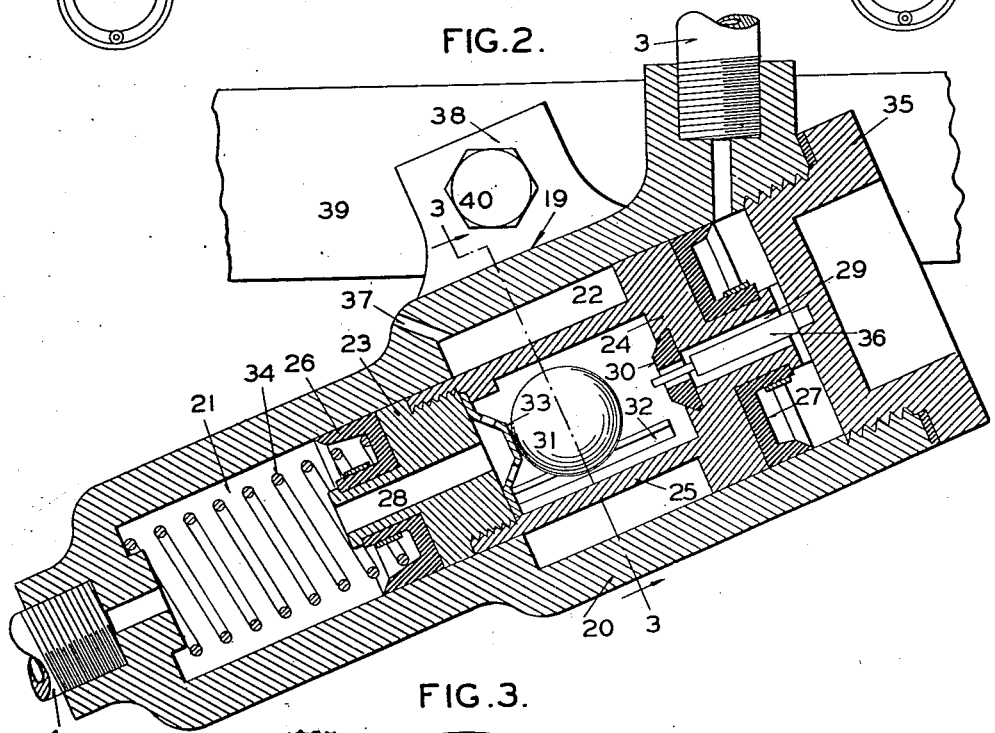
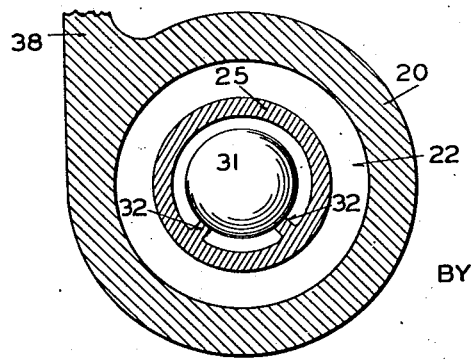
INVENTOR
W.R. FREEMAN
BY
E. C. Huffman
ATTORNEY Patented Apr. 29, 1941

2,239,955

UNITED STATES PATENT OFFICE 2,239,955

INERTIA-OPERATED RATIO CHANGING BRAKE ACTUATING SYSTEM

Walter R. Freeman, University City, Mo., assignor to Wagner Electric Corporation, St. Louis, Mo., a corporation of Delaware Application September 2, 1939, Serial No. 293,178

8 Claims. (Cl. 188—152)

My invention relates to braking apparatus and more particularly to a ratio changing means for a fluid pressure brake actuating system.

One of the objects of my invention is to provide in a brake actuating system automatically operable means governed by the rate of deceleration of a vehicle for changing the ratio between the pressure being applied to the actuating system and the pressure being applied to all the braking units.

Another and more specific object of my invention is to provide in a fluid braking system a device for increasing the fluid pressure applied to all the braking units and to so control the operativeness of this device by an inertia-actuated element that it will be effective during braking when the rate of deceleration of the vehicle is greater than a predetermined value.

Other objects of my invention will become apparent from the following description taken in connection with the accompanying drawing in which Figure 1 is a diagrammatic view of a fluid pressure braking system embodying my invention; Figure 2 is a longitudinal cross-sectional view of the inertia-operated ratio changing device; and Figure 3 is a cross-sectional view taken on the line 3—3 of Figure 2.

Referring to the drawing in detail, numeral 1 indicates a master cylinder device actuated by a pedal 2 for supplying fluid under pressure to a braking system. The outlet of the master cylinder is connected to conduits 3 and 4, the latter communicating with conduits 5 and 6 leading to the front and rear brakes, respectively. The front braking units 7 and 8 have their brake shoes actuated by fluid motors 9 and 10 communicating with the conduit 5 by conduits 11 and 12 and the rear braking units 13 and 14 have their brake shoes actuated by fluid motors 15 and 16 communicating with the conduit 6 by conduits 17 and 18.

In accordance with my invention, I interpose between the conduits 3 and 4, an inertia-controlled device 19 for automatically changing the ratio between the fluid pressure developed by the master cylinder and the fluid pressure in all the fluid motors when the rate of deceleration of the vehicle is greater than a predetermined value. Thus it is possible for the operator to obtain a greater actuating force on the brake shoes for a given force applied to the brake pedal and at a time when such greater force is required to stop the vehicle quickly.

As shown in Figures 2 and 3, the ratio changing device comprises a casing 20 provided with cylinders 21 and 22 of different diameters, the larger of which has its end connected to the conduit 3 leading from the master cylinder and the smaller of which has its end connected to conduit 4 leading to the fluid motors of all the brakes. The cylinder 21 has positioned therein a piston 23 and cylinder 22, a piston 24 which is provided with a cylindrical portion 25 for connecting the pistons together. Packing cups 26 and 27 prevent leakage past the pistons. The piston 23 is provided with a passage 28 and the piston 24 with a passage 29, the two of which and the cylindrical portion 25 forming a by-pass passage through the pistons.

The inner end of the passage 29 has associated therewith an annular valve element 30 made of rubber or like material and positioned in the cylindrical portion 25 is a rolling ball 31 adapted to cooperate with the valve element to close the passage. The cylindrical portion 25 is provided with ribs 32 which form a track on which the ball can roll. A perforated baffle 33 prevents the ball from closing passage 28 in piston 23. The pistons are biased to one end of their cylinders, as shown, by a spring 34 interposed between the small piston and the outer end of the small cylinder. When the pistons are in their inoperative positions, the large piston abuts the closure plug 35 and carried by this plug is a pin 36 which extends through the passage 29 and to a point beyond the valve element 30. Thus it is seen that this pin will cause the ball to be disengaged from the valve element 30 when the pistons are in their inoperative positions as shown.

The casing 20 is provided with a passage 37 for preventing air from being trapped behind the large piston 24. The casing carries an attaching lug 38 for mounting the device on a support 39 by a bolt 40.

In operation, the casing is mounted on the vehicle so that the track is longitudinal and inclined toward the forward end of the vehicle when the vehicle is on a horizontal roadway. Thus, under these conditions, the action of gravity will maintain the ball disengaged from the valve element 30 and fluid under pressure may freely flow to and from the fluid motors and the brakes actuated and released in a normal manner. When the brakes are applied, the interconnected pistons will be moved forward against the action of the spring 34 notwithstanding the fluid under pressure in the system is uniform since the larger area of the piston 24 results in a differential force. This movement of the pistons will result in the valve 30 moving away from the end of pin 36 and to a position where the ball can engage it.

When the brakes are applied with sufficient pressure to cause such a rate of deceleration that the action of inertia will move the ball to a position where it engages the valve element 30, the passage through the pistons will become closed. Once the ball is seated, it will remain seated as the fluid pressure acting to hold it seated will always be greater than the fluid pressure acting to unseat it. After the passage through the pistons becomes closed, the pressure created by the master cylinder will act directly on the large piston and cause it to apply force to the small piston and by means of the small piston, additional pressure to the column of fluid communicating with all the fluid motors of the brakes. Since the area of piston 23 is smaller than piston 24, a given fluid pressure acting on the piston 24 will create a greater fluid pressure in the cylinder 21 and the fluid motors. Thus it is seen that when the device becomes operative there will be a change in ratio between the fluid pressure created by the master cylinder and the fluid pressure in the fluid motors acting on the brakes. Therefore, the operator can apply the brakes with greater force by a given force on the pedal which is very desirable when high braking action becomes necessary in making quick stops.

When the fluid pressure created by the master cylinder is released, the fluid pressure acting on the small piston will move the pistons to their inoperative positions as shown in Figure 2. During the return movement of the pistons, the ball will remain engaged with the valve element due to the fluid pressure acting thereon. When the large piston reaches the end of its cylinder, pin 36 will cause the ball to be disengaged from the valve element and when this occurs the fluid pressure acting on the fluid motors will be released, thereby releasing the brakes.

By changing the setting of the casing and the angle of inclination of the track for the ball, the point in the rate of deceleration at which the ratio changing device becomes operative can be varied as desired. The ratio between the fluid pressure created by the master cylinder and that effective in the fluid motors is determined by the areas of the pistons.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid braking system for a vehicle, a plurality of brakes, means for actuating the brakes and comprising a source of pressure, a fluid motor associated with each brake and conduit means for connecting the motors to the source of pressure, and means associated with the conduit means and responsive to deceleration of the vehicle for changing the ratio between the fluid pressure supplied by said source and the fluid pressure acting on all the motors.

2. In fluid pressure braking apparatus for a vehicle, a plurality of brakes, means for actuating the brakes and comprising a source of pressure, a fluid motor associated with each brake and conduit means for connecting the motors to the source of pressure to permit fluid under pressure from said source to be directly supplied to the motors, and means responsive to deceleration of the vehicle for causing the fluid under pressure in all the fluid motors to be different than the fluid under pressure supplied by said source.

3. In fluid pressure braking apparatus for a vehicle, a plurality of brakes, means for actuating the brakes and comprising a source of pressure, a fluid motor associated with each brake and conduit means for connecting the motors to the source of pressure to permit fluid under pressure from said source to be supplied to the motors, and means responsive to deceleration of the vehicle for cutting off all the motors from said source and for causing fluid under pressure from said source to apply a different pressure to the body of fluid that is cut off.

4. In fluid pressure braking apparatus for a vehicle, a plurality of brakes, means for actuating the brakes and comprising a source of pressure, a fluid motor associated with each brake and conduit means for connecting the motors to the source of pressure to permit fluid under pressure from said source to be supplied to the motors, means responsive to deceleration of the vehicle for cutting off all the motors from said source and for causing fluid under pressure from said source to apply a different pressure to the body of fluid that is cut off, said means comprising two interconnected pistons of different diameters, a by-pass passage, and valve means controlled by a predetermined rate of deceleration for closing said passage.

5. In fluid pressure braking apparatus for a vehicle, a plurality of brakes, means for actuating the brakes and comprising a source of pressure, a fluid motor associated with each brake and conduit means for connecting the motors to the source of pressure to permit fluid under pressure from said source to be supplied to the motors, means responsive to deceleration of the vehicle for cutting off all the motors from said source and for causing fluid under pressure from said source to apply a different pressure to the body of fluid that is cut off, said means comprising two interconnected pistons of different diameters, a by-pass passage, a valve seat associated with the passage, and a rolling ball controlled by the action of inertia for engaging said seat and closing the passage against flow of fluid from the source to the motors when the rate of deceleration of the vehicle exceeds a predetermined value.

6. In fluid pressure braking apparatus for a vehicle, a plurality of brakes, means for actuating the brakes and comprising a source of pressure, a fluid motor associated with each brake and conduit means for connecting the motors to the source of pressure to permit fluid under pressure from said source to be supplied to the motors, means responsive to deceleration of the vehicle for cutting off all the motors from said source and for causing fluid under pressure from said source to apply a greater pressure to the body of fluid that is cut off, said means comprising two cylinders of different diameters, the larger of which is connected to the source of pressure and the smaller of which is connected to the fluid motors of all the brakes, pistons in the cylinders, means connecting the pistons together whereby the larger can move the smaller, means providing a by-pass passage around the pistons, and a rolling ball for closing said passage, said ball being so mounted as to move to closed position and prevent flow of fluid from the source to the motors when the rate of deceleration of the vehicle is a predetermined value.

7. In fluid pressure braking apparatus for a vehicle, a plurality of brakes, means for actuating the brakes and comprising a source of pressure, a fluid motor associated with each brake and conduit means for connecting the motors to the source of pressure to permit fluid under pressure from said source to be supplied to the motors, means responsive to deceleration of the vehicle for cutting off all the motors from said source and for causing fluid under pressure from said source to apply a different pressure to the body of fluid that is cut off, said means comprising two cylinders of different diameters, the larger of which is connected to the source of pressure and the smaller of which is connected to the fluid motors of all the brakes, pistons in the cylinder, means connecting the pistons together whereby the larger can move the smaller, means providing a by-pass passage around the pistons, a rolling ball for closing said passage, said ball being so mounted as to move to closed position when the rate of deceleration of the vehicle is a predetermined value, and means for positively preventing said ball from closing the passage when the pistons are moved to their inoperative positions after the fluid pressure acting on the large piston is released.

8. In fluid pressure braking apparatus for a vehicle, a plurality of brakes, means for actuating the brakes and comprising a source of pressure, a fluid motor associated with each brake and conduit means for connecting the motors to the source of pressure to permit fluid under pressure from said source to be supplied to the motors, means controlled by a predetermined rate of deceleration of the vehicle for cutting off all the motors from said source and for causing fluid under pressure from said source to apply a different pressure to the body of fluid that is cut off, said means comprising two cylinders of different diameters, the larger of which is connected to the source of pressure and the smaller of which is connected to the fluid motors of all the brakes, pistons in the cylinder, means forming a passage through the piston and including an enlarged chamber, valve means for closing said passage including a valve seat and a cooperating rolling ball in the chamber, said ball being so mounted as to roll to a position to engage said seat in response to deceleration of the vehicle, and a member for preventing said ball from engaging the seat or remaining engaged with the seat when the pistons are in their inoperative positions.

WALTER R. FREEMAN.